(12) United States Patent
Dhaka (10) Patent No.: US 11,417,150 B2
(45) Date of Patent: Aug. 16, 2022

(54) INFORMATION PROCESSING APPARATUS, METHOD, AND NON-TRANSITORY COMPUTER-READABLE MEDIUM

(71) Applicant: NEC CORPORATION, Tokyo (JP)

(72) Inventor: Devendra Dhaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/954,840

(22) PCT Filed: Dec. 28, 2017

(86) PCT No.: PCT/JP2017/047235
§ 371 (c)(1),
(2) Date: Jun. 17, 2020

(87) PCT Pub. No.: WO2019/130548
PCT Pub. Date: Jul. 4, 2019

(65) Prior Publication Data
US 2021/0097265 A1 Apr. 1, 2021

(51) Int. Cl.
*G06V 40/20* (2022.01)
*G06T 7/277* (2017.01)
(Continued)

(52) U.S. Cl.
CPC ........... *G06V 40/20* (2022.01); *G06K 9/6226* (2013.01); *G06K 9/6267* (2013.01); *G06T 7/277* (2017.01);
(Continued)

(58) Field of Classification Search
None
See application file for complete search history.

(56) References Cited

U.S. PATENT DOCUMENTS

| 9,349,275 B2* | 5/2016 | Saitwal | G06K 9/00778 |
| 2010/0207762 A1* | 8/2010 | Lee | G06K 9/00771 |
| | | | 340/541 |

(Continued)

FOREIGN PATENT DOCUMENTS

| JP | 2011-100175 A | 5/2011 |
| JP | 2017-076289 A | 4/2017 |
| WO | 2010/141116 A2 | 12/2010 |

OTHER PUBLICATIONS

Almingol, Javier et al., "Learning Multiple Behaviors from Unlabeled Demonstrations in a Latent Controller Space", International Conference on Machine Learning 2013, 9 pages.
(Continued)

*Primary Examiner* — Vikkram Bali
(74) *Attorney, Agent, or Firm* — Sughrue Mion, PLLC (57) ABSTRACT

The information processing apparatus (2000) of the example embodiment 1 includes an acquisition unit (2020), a clustering unit (2040), and a modeling unit (2060). The acquisition unit (2020) acquires a plurality of trajectory data. Until a predetermined termination condition is satisfied, the clustering unit (2040) repeatedly performs: 1) dividing the plurality of trajectory data into one or more groups using a group identity distribution of each trajectory data; 2) determining a time-sequence of representative velocity for each group; 3) determining, for each trajectory data, a time-sequence of a latent position distribution of a corresponding object; and 4) determining a scaling factor for each trajectory data; and 5) updating the group identity distribution of each trajectory data. The modeling unit (2060) generates a model data for each group. The model data includes the time-sequence of representative velocity generated by the clustering unit (2040).

6 Claims, 7 Drawing Sheets

(51) Int. Cl.
*G06K 9/62* (2022.01)
*G06V 20/52* (2022.01)

(52) U.S. Cl.
CPC .... *G06V 20/52* (2022.01); *G06T 2207/10016* (2013.01); *G06T 2207/20076* (2013.01); *G06T 2207/30232* (2013.01); *G06T 2207/30241* (2013.01)

(56) References Cited

U.S. PATENT DOCUMENTS

2010/0208063 A1    8/2010    Lee et al.
2011/0052000 A1*    3/2011    Cobb ..................... G06T 7/246
                                                              382/103

OTHER PUBLICATIONS

Julian F.P. Kooij et al., "A Nonparametric Hierarchical Model to Discover Behavior Dynamics from Tracks", European Conference on Computer Vision 2012, Part VI, LNCS 7577, pp. 270-283.
Written Opinion for PCT/JP2017/047235, dated Mar. 20, 2018.
International Search Report for PCT/JP2017/047235, dated Mar. 20, 2018.

* cited by examiner

FIG. 1

FIG. 2 comparision w/o scaling

Trajectory data is determined not to be represented by model data due to speed difference

--- comparision w/- scaling

Trajectory data is determined to be repsented by model data

INFORMATION PROCESSING APPARATUS, METHOD, AND NON-TRANSITORY COMPUTER-READABLE MEDIUM

TECHNICAL FIELD

Embodiments of the invention generally relate to the field of video analysis.

BACKGROUND ART

With the advances and growing need of automated recognition to be employed in surveillance systems for public or crowded places e.g. airports, train stations and platforms etc. demands an effective approach for modeling the crowd trajectories and recognition of anomalous behavior activities which contribute to majority of security threatening acts.

The behavior recognition task can be broken down into two major phases: training phase and test phase. The training phase performs modeling each input normative trajectory of objects, e.g. people, in terms of motion primitive elements such as position and/or velocity. The test phase computes likelihood of that a trajectory to be tested is represented by the learnt model using parameter of the learnt models, and thereby determining whether the trajectory to be tested describes normal behavior or abnormal one. In the test phase, trajectories with higher likelihood are determined to describe a normal behavior which consent with most of the input trajectories, on contrary, trajectories with lower likelihood are determined to describe anomalous one.

NPL 1 and NPL2 are prior arts for behavior modeling. Both of them divides input trajectories to be used for training into groups so that trajectories in the same group have similar velocity profiles, and generates a model for group.

CITATION LIST

Non Patent Literature

[NPL 1] Almingol, Javier et al., "Learning Multiple Behaviors from Unlabeled Demonstrations in a Latent Controller Space", International Conference on Machine Learning 2013

[NPL 2] Kooij Julian F P et al., "A Nonparametric Hierarchical Model to Discover Behavior Dynamics from Tracks", European Conference on Computer Vision 2012

SUMMARY OF INVENTION

Technical Problem

As described above, the behavior recognition task includes the calculation of likelihood that the trajectory data is represented by the model data. Therefore, the accuracy of the calculation of this likelihood is of very importance for accurate behavior recognition. The inventor of this application finds out that behavior recognition techniques disclosed by NPL1 and NPL2 still have room for improving the accuracy of the calculation of the above-mentioned likelihood.

The objective of the present invention is to provide a novel way of behavior recognition with accurate calculation of likelihood that the trajectory data is represented by the model data.

Solution to Problem

There is provided an information processing apparatus comprising: 1) an acquisition unit acquiring a plurality of trajectory data each of which represents a time-sequence of an observed position of an object; 2) a clustering unit repeatedly performs, until a termination condition is satisfied: 2-a) for each individual trajectory data, dividing the plurality of trajectory data into one or more groups by determining to which the trajectory data belongs based on a group identity distribution of the trajectory data, the group identity distribution of the trajectory data representing a probabilistic distribution of to which group the trajectory data belongs; 2-b) generating a time-sequence of representative velocity for each group; 2-c) for each trajectory data, generating a time-sequence of a latent position distribution of a corresponding object; 2-d) computing a scaling factor for each trajectory data; 2-e) for each trajectory data, computing the likelihood that the trajectory data is classified into each group based on the trajectory data and the scaling factor, and thereby updating the group identity distribution of the trajectory data; and 4) a modeling unit generates a model data for each group, the model data including the time-sequence of representative velocity.

There is provided an information processing apparatus comprising: 1) an acquisition unit acquiring trajectory data that represents a time-sequence of an observed position of an object, and model data that includes a time-sequence of a representative velocity of objects, 2) a likelihood calculation unit calculating for each model data: 2-a) computing a scaling factor of the trajectory data with respect to the model data; 2-b) generating a time-sequence of a latent position distribution of the object based on the scaling factor, the trajectory data, and the model data and 2-c) computing the likelihood of that the trajectory data is represented by the model data; and 3) a classification unit determining that the trajectory data represents a normal behavior when there is at least one model data that represents the trajectory data, and determining that the trajectory data represents an abnormal behavior when there is no model data that represents the trajectory data.

There is provided a method, performed by a computer, comprising: 1) acquiring a plurality of trajectory data each of which represents a time-sequence of an observed position of an object; 2) repeatedly performs, until a termination condition is satisfied: 2-a) for each individual trajectory data, dividing the plurality of trajectory data into one or more groups by determining to which the trajectory data belongs based on a group identity distribution of the trajectory data, the group identity distribution of the trajectory data representing a probabilistic distribution of to which group the trajectory data belongs; 2-b) generating a time-sequence of representative velocity for each group; 2-c) for each trajectory data, generating a time-sequence of a latent position distribution of a corresponding object; 2-d) computing a scaling factor for each trajectory data; 2-e) for each trajectory data, computing the likelihood that the trajectory data is classified into each group based on the trajectory data and the scaling factor, and thereby updating the group identity distribution of the trajectory data; 3) generating a model data for each group, the model data including the time-sequence of representative velocity.

There is provided a method, performed by a computer, comprising: 1) acquiring trajectory data that represents a time-sequence of an observed position of an object, and model data that includes a time-sequence of a representative velocity of objects; 2) calculating for each model data; 2-a) computing a scaling factor of the trajectory data with respect to the model data; 2-b) generating a time-sequence of a latent position distribution of the object based on the scaling factor, the trajectory data, and the model data; and 2-c)

computing the likelihood of that the trajectory data is represented by the model data; and 3) determining that the trajectory data represents a normal behavior when there is at least one model data that represents the trajectory data, and determining that the trajectory data represents an abnormal behavior when there is no model data that represents the trajectory data.

There is provided a program causing a computer to execute each step of any one of the methods provided by the present invention.

Advantageous Effects of Invention

In accordance with the present invention, a novel way of behavior recognition with accurate calculation of likelihood that the trajectory data is represented by the model data is provided.

BRIEF DESCRIPTION OF DRAWINGS

The above-mentioned objects, other objects, features and advantages will be made clearer from the preferred example embodiments described below, and the following accompanying drawings.

DESCRIPTION OF EMBODIMENTS

Hereinafter, example embodiments of the present invention will be described with reference to the accompanying drawings. In all the drawings, like elements are referenced by like reference numerals and the descriptions thereof will not be repeated.

Example Embodiment 1

<Overview>

The information processing apparatus 2000 of the example embodiment 1 acquires a plurality of a trajectory data, divides them into groups, and generates a model data for each group. In other words, the information processing apparatus 2000 of the example embodiment 1 performs a training phase in behavior recognition. The trajectory data includes a time-sequence of an observed position of an object, thereby representing an observed behavior of the object. The model data includes a representative velocity of objects corresponding to trajectory data included in that group. In other words, each trajectory data included in the group is represented by the model data corresponding to that group. Therefore, the groups are generated so that, for each trajectory data included in the group, the likelihood of that the trajectory data is represented by the model data corresponding to that group is substantially high.

Figure 1:
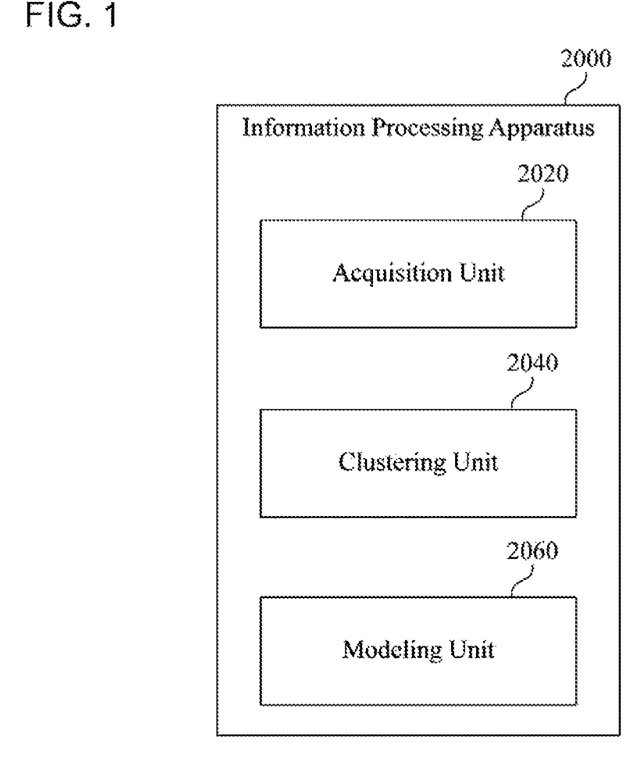
FIG. 1 illustrates an example diagram of a function-based configuration of the information processing apparatus of the example embodiment 1.

FIG. 1 illustrates an example diagram of a function-based configuration of the information processing apparatus 2000 of the example embodiment 1. The information processing apparatus 2000 of the example embodiment 1 includes an acquisition unit 2020, a clustering unit 2040, and a modeling unit 2060. The acquisition unit 2020 acquires a plurality of trajectory data.

Until a predetermined termination condition is satisfied, the clustering unit 2040 repeatedly performs: 1) dividing the plurality of trajectory data into one or more groups using a group identity distribution of each trajectory data; 2) determining a time-sequence of representative velocity for each group; 3) determining, for each trajectory data, a time-sequence of a latent position distribution of a corresponding object; and 4) determining a scaling factor for each trajectory data; and 5) updating the group identity distribution of each trajectory data.

The group identity distribution is a probability distribution defined for each trajectory data, and the group identity distribution for a trajectory data shows a probability distribution of to which group the trajectory data belongs. The group identity distribution of the trajectory data is updated in 5), based on the trajectory data and the time-sequence of the latent position distribution of the object corresponding to the trajectory data.

The modeling unit 2060 generates a model data for each group. The model data includes the time-sequence of representative velocity generated by the clustering unit 2040. Specifically, the model data for a certain group includes the time-sequence of representative velocity determined for that group in the final iteration of the processes 1) to 5) that the clustering unit 2040 repeatedly performs.

Advantageous Effect

Figure 2:
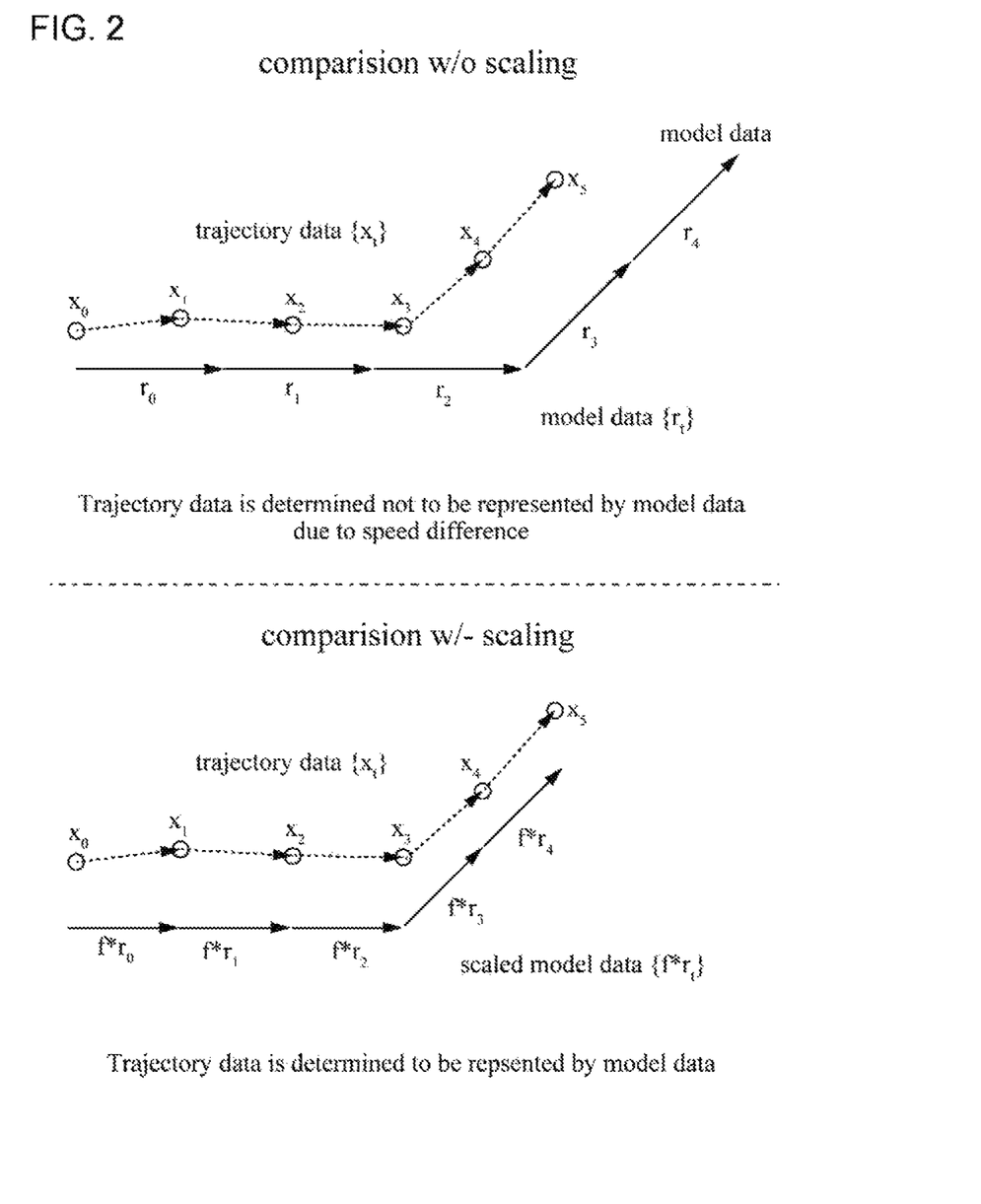
FIG. 2 illustrates an advantageous effect of the information processing apparatus of the example embodiment 1.

FIG. 2 illustrates an advantageous effect of the information processing apparatus 2000 of the example embodiment 1. With a model data describing a behavior of objects by velocity profile (e.g. time-sequence of representative velocity), the likelihood of that the trajectory data is represented by the model data is determined to be low due to mere difference in speed therebetween (i.e. slower/faster), even if the trajectory data indicates that the object moves in the same direction as the model data describes (See the upper case of FIG. 2).

The information processing apparatus 2000 accommodate such speed difference by introducing scaling factor. The lower case of FIG. 2 shows a comparison between the trajectory data and the model data scaled with the scaling factor that is determined for the trajectory data with respect to the model data (group). The trajectory data and the scaled model data are substantially similar to each other, and therefore the likelihood of that the trajectory data is represented by the model data is determined to be substantially high in this case. By introducing this accurate way of calculating the likelihood, the information processing apparatus 2000 of this example embodiment achieves accurate behavior recognition.

In the following descriptions, the detail of the information processing apparatus 2000 of the present Example embodiment will be described.

<Flow of Process>

Figure 3:
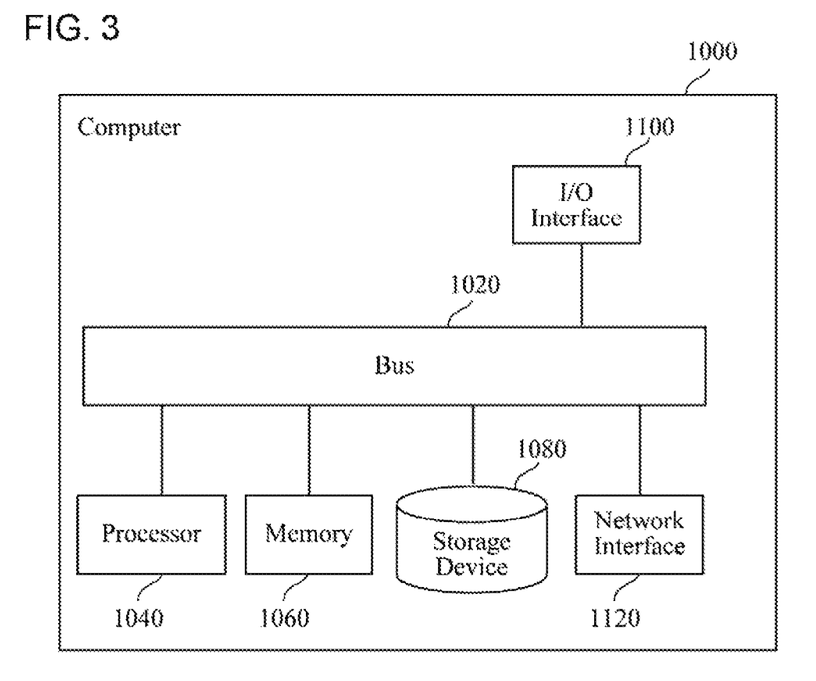
FIG. 3 is a flowchart illustrating a flow of processes performed by the information processing apparatus of the example embodiment 1.

FIG. 3 is a flowchart illustrating a flow of processes performed by the information processing apparatus 2000 of the example embodiment 1. The acquisition unit 2020 acquires a plurality of the trajectory data (S102).

Steps S104 to S116 form a loop process A that is repeatedly performed until a predetermined termination condition is satisfied. For example, the termination condition may be defined as the number of times that loop process A is performed.

The clustering unit 2040 divides the plurality of the trajectory data into one or more groups using a group identity distribution of each trajectory data (S106). The clustering unit 2040 generates the time-sequence of representative velocity for each group (S108). For each trajectory data, the clustering unit 2040 generates the time-sequence of the latent position distribution of the object corresponding to the trajectory data (S110). The clustering unit 2040 calculates the scaling factor for each trajectory data (S112). The clustering unit 2040 updates the group identity distribution of each trajectory data (S114).

After finishing the loop process A, the modeling unit generates the model data for each group (S118).

<Trajectory Data>

As described above, the trajectory data includes the time-sequence of the observed position of the object. The observed position of the object may be the position of the object computed using an image data that captures the object. The image data may be one of video frames generated by a camera (e.g. surveillance camera) that captures a scene. Note that, a well-known technique can be used to generate the trajectory data of the object from video frames capturing the object.

In some embodiments, the trajectory data may be generated by the information processing apparatus 2000. In this case, the information processing apparatus 2000 acquires a video data capturing an object, detects the object from each video frame of the video data, calculates the position (observed position) of the object in each video frame, and generates the trajectory data that shows the calculated positions in time order. The generated trajectory data is stored in a storage device, e.g. the storage device 1080. The acquisition unit 2020 acquires the trajectory data from that storage device. In other embodiments, an apparatus other than the information processing apparatus 2000 may generate the trajectory data.

The acquisition unit 2020 acquires the plurality of the trajectory data (S102). There is a variety of ways to acquire the trajectory data. In some embodiments, the acquisition unit 2020 may acquire the trajectory data from a storage device storing the trajectory data, which may be installed inside or outside the information processing apparatus 2000. In some embodiments, the acquisition unit 2020 receives the trajectory date sent from an apparatus that generates the trajectory data.

<Clustering>

The clustering unit 2040 divides the plurality of trajectory data acquired into one or more groups. Before explaining an example algorithm of clustering, some notations for explanation are shown below.

The trajectory data i for the object i, where i is an identifier of the object, is denoted as Xi. The trajectory data Xi includes $\{x_{i,t} | 0 \leq t < n\}$, where t is a time frame number and n is the number of positions includes in the trajectory data Xi.

The latent position distribution of the object i at time frame t is denoted by zit. The latent position distribution represents a probability distribution of an estimated position of the object i at the time frame t under the assumption that the object i behaves according to the representative velocities of the group to which the trajectory data Xi belongs. In other words, the observed positions included in the trajectory data are handled as including some noise. The relationship between zit and xit may be formulated as follows:

Equation 1

$$z_{i,t} = x_{i,t} - n_{i,t} \quad (1)$$

where nit represents a noise included in the observed position xit.

The noise nit is a sample from a probability distribution of noise. Therefore, the latent position distribution zit is also a sample from a probability distribution, i.e. latent position distribution. The noise nit may be estimated with a variety of well-known techniques. For example, the noise is assumed to be a random sample from a Gaussian distribution with some predefined variance. Note that, it is preferable that the noise for any time frame is independent of rest of the time frames and depends only on the current time.

A time-sequence of the latent position distribution zit may be formulated as an auto regressive with finite degree q; the latent position distribution at each time frame depends on its previous q states and control term through a linear relationship. For q=1, the time-sequence of the latent position distribution zit can be described as follows:

Equation 2

$$z_{i,t} = a_i z_{i,t-1} + v_{i,t} \quad (2)$$

In Equation 2, ai is an auto-regressive coefficient for the trajectory data i. In some embodiments, ai for each trajectory data i is assumed to be a random sample from Gaussian distribution with some predefined variance. However one is allowed to choose any kind of distribution for this coefficient. For example, ai can be simply assumed to be 1 for each trajectory data.

The control term vit is an estimated velocity of the object i at the time frame t. Using the representative velocity rjt, which is the representative velocity of the group j at the time frame t to which the trajectory data i is classified into, the estimated velocity vit can be described as follows:

Equation 3

$$v_{i,t} = f_i * r_{j,t} + n2_t \quad (3)$$

where fi is the scaling factor of the object i with respect to the representative velocities of the group j, and n2t is noise included in the estimated velocity. Note that, the scaling factor is constant through all of time frames.

Figure 4:
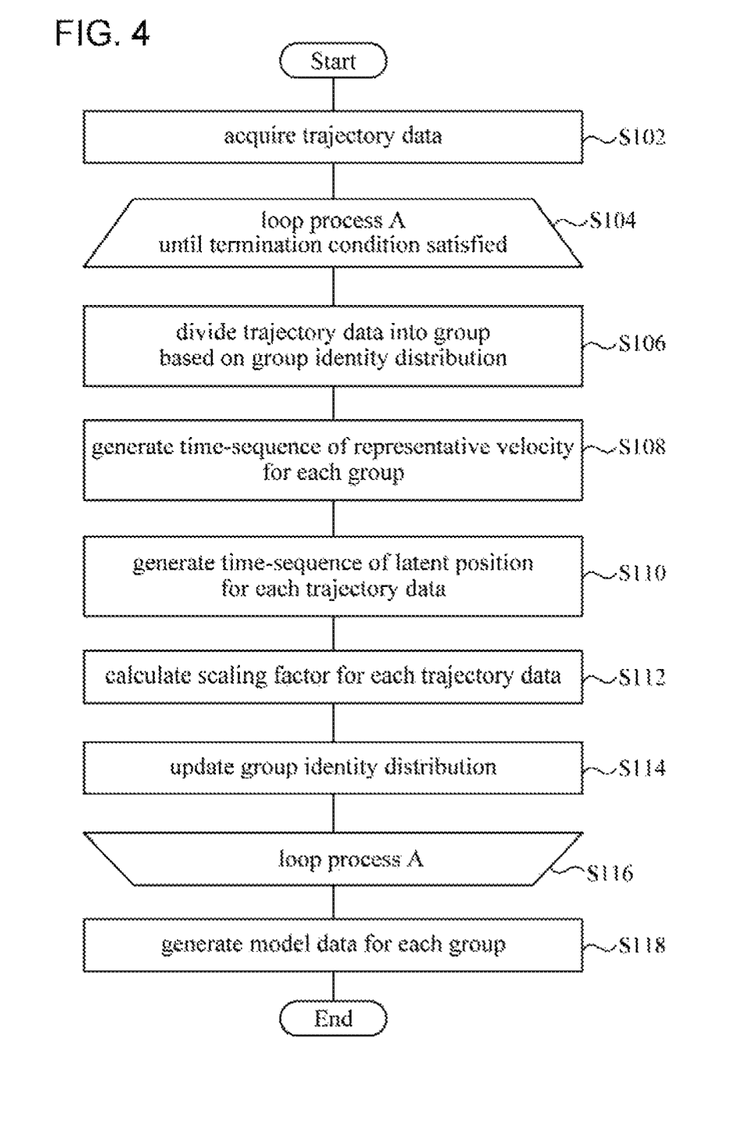
FIG. 4 illustrates an example algorithm of clustering with which the clustering unit divides the plurality of the trajectory data into groups.

An example algorithm of clustering will be explained using the above notations. FIG. 4 illustrates an example algorithm of clustering with which the clustering unit 2040 divides the plurality of the trajectory data into groups.

The clustering unit 2040 performs an initialization process (S202). In the initialization process, the clustering unit 2040 initializes the scaling factor fi for each trajectory data i. There is a variety of ways to initialize the scaling factor fi. For example, the clustering unit 2040 samples a random value from a Gaussian distribution for each scaling factor. As described later, each scaling factor will be repeatedly updated.

In addition, the clustering unit 2040 generates a group 0, and put all of the trajectory data acquired into the group 0.

After the initialization process, the clustering unit 2040 repeatedly performs the loop process A until a predetermined termination condition is satisfied. In step S206, the clustering unit 2040 samples a group identifier for each trajectory data from the group identifier distribution of each trajectory data, and thereby classifying each trajectory data into the group having the group identifier sampled for each trajectory data. The definition of the group identifier distribution will described later. As describing later, from the group identifier distribution, not only an existing group identifier, but also a new group identifier can be sampled. When a new group identifier is sampled for a trajectory data, the new group having this new group identifier sampled is generated, and the trajectory data is classified into this new group. One of example ways to sample cluster identifier is described in NPL 2.

After dividing trajectory data into groups, the clustering unit 2040 performs the loop process B for each group. In the loop process B with the group j, the clustering unit 2040 performs the loop process C for each time frame. In the loop process C with the group j and the time frame t, the clustering unit 2040 samples the representative velocity rjt. The sampling of the representative velocity rjt is done by marginalizing latent position distributions of the trajectory data that belong to the group j.

After sampling the representative velocity rjt, the clustering unit samples the latent position for each trajectory data i in the group j. The latent position can be sampled using ubiquitous and widely applicable Kalman filtering approach.

After terminating the loop process B, the clustering unit 2040 samples the scaling factor fi for each trajectory data i, given the sample relative velocities rjt of the group j into which the trajectory data i is currently classified and the sampled latent positions.

For each trajectory data, the clustering unit 2040 updates the group identifier distribution. The probability of that the group identifier j is sampled for the trajectory data i (i.e. the probability of that the trajectory data i is classified into the group j) is denoted by Pr(i,j), and defined as follows:

Equation 4

$$Pr(i,j) = (\text{Probability of picking up group identifier } j) * (\text{Likelihood of trajectory data } i \text{ to belong to group } j) \quad (4)$$

The probability of picking up the group identifier j for trajectory data i may be defined as follows:

Equation 5

$$\frac{N_j}{\alpha + N - 1} \text{ for group } j \text{ to which trajectory data } i \text{ does not currently belongs}$$

$$\frac{N_j - 1}{\alpha + N - 1} \text{ for group } j \text{ to which trajectory data } i \text{ currently belongs}$$

$$\frac{\alpha}{\alpha + N - 1} \text{ for new group} \quad (5)$$

where α is a parameter (i.e. predetermined value, such as 1), Nj is the number of trajectory data belonging to the group j, and N is the total number of the trajectory data.

The likelihood of that trajectory data i belongs to a new group may be computed using prior beliefs (defined beforehand), using standard techniques. On the other hand, for each existing group j, the likelihood of trajectory data i to belong to group j may be computed using the scaling factor fi regarding to the group j and the trajectory data i. This may be computed using Kalman filter equations.

<Example of Hardware Configuration>

In some embodiments, each functional unit included in the information processing apparatus 2000 may be implemented with at least one hardware component, and each hardware component may realize one or more of the functional units. In some embodiments, each functional unit may be implemented with at least one software component. In some embodiments, each functional unit may be implemented with a combination of hardware components and software components.

The information processing apparatus 2000 may be implemented with a special purpose computer manufactured for implementing the information processing apparatus 2000, or may be implemented with a commodity computer like a personal computer (PC), a server machine, or a mobile device. In addition, the information processing apparatus 2000 may be implemented with a camera that captures video frames with which each trajectory data is generated. As a camera with which the information processing apparatus is implemented, so-called IP (Internet Protocol) camera, network camera, or intelligent camera may be used.

Figure 5:
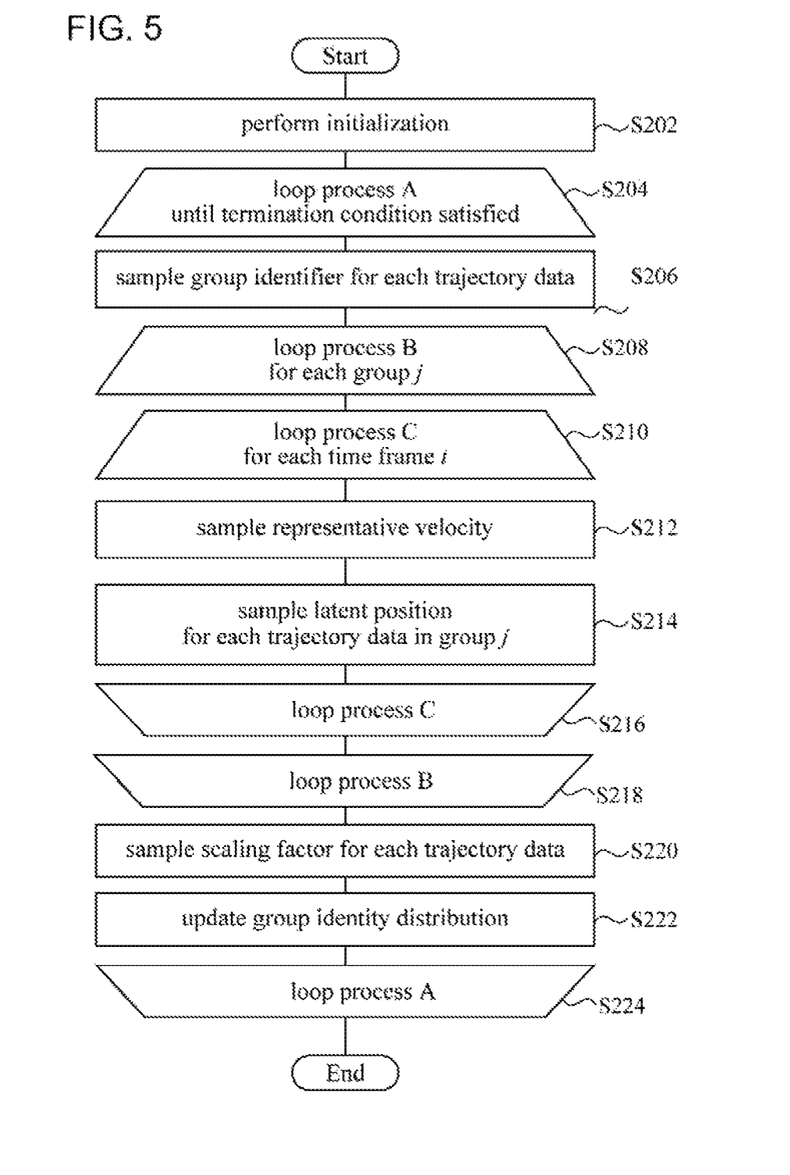
FIG. 5 is a block diagram illustrating an example of hardware configuration of a computer realizing the information processing apparatus of the example embodiment 1.

FIG. 5 is a block diagram illustrating an example of hardware configuration of a computer 1000 realizing the information processing apparatus 2000 of the example embodiment 1. In FIG. 5, the computer 1000 includes a bus 1020, a processor 1040, a memory 1060, a storage device 1080, an input-output (I/O) interface 1100, and a network interface 1120.

The bus 1020 is a data transmission channel in order for the processor 1040, the memory 1060 and the storage device 1080 to mutually transmit and receive data. The processor 1040 is a processor such as CPU (Central Processing Unit), GPU (Graphics Processing Unit), or FPGA (Field-Programmable Gate Array). The memory 1060 is a primary storage device such as RAM (Random Access Memory). The storage medium 1080 is a secondary storage device such as hard disk drive, SSD (Solid State Drive), or ROM (Read Only Memory).

The I/O interface is an interface between the computer 1000 and peripheral devices, such as keyboard, mouse, or display device. The network interface is an interface between the computer 1000 and a communication line through which the computer 1000 communicates with another computer.

The storage device 1080 may store program modules, each of which is an implementation of a functional unit of the information processing apparatus 2000 (See FIG. 1). The CPU 1040 executes each program module, and thereby realizing each functional unit of the information processing apparatus 2000.

Example Embodiment 2

<Overview>

The information processing apparatus 2000 of the example embodiment 2 acquires the trajectory data (hereinafter, target trajectory data) and one or more model data, and determines whether the target trajectory data describes a normal behavior or an abnormal one. In other words, the information processing apparatus 2000 of the example embodiment 2 performs a test phase in behavior recognition. Specifically, the information processing apparatus 2000 determines whether there is any model data that represents the target trajectory data well. If there is any model data that represents the target trajectory data well, the information processing apparatus 2000 determines that the input trajectory data describes a normal behavior. On the other hand, if there is no model data that represents the target trajectory data well, the information processing apparatus 2000 determines that the target trajectory data shows an abnormal behavior.

In order to do so, the information processing apparatus 2000 of this example embodiment calculates likelihood of that the target trajectory data is represented by a model data for each model data. The information processing apparatus 2000 determines that the trajectory data describes a normal behavior when there is the model data for which the calculated likelihood is substantially high, e.g. higher than a predetermined threshold. On the other hand, the information processing apparatus 2000 determines that the trajectory data describes an abnormal behavior when there is no model data for which the calculated likelihood is substantially high.

Figure 6:
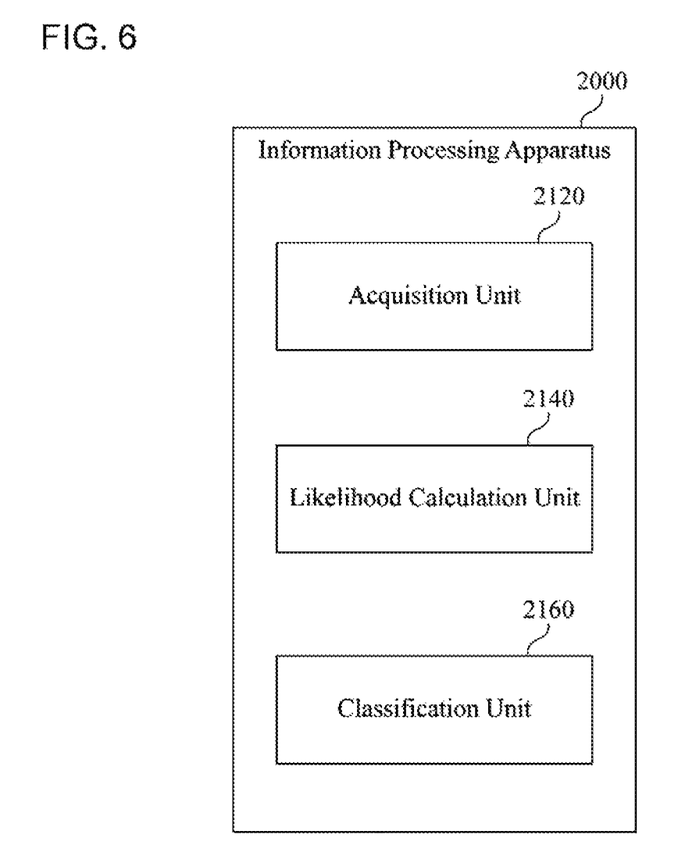
FIG. 6 is an example block diagram illustrating a function-based configuration of the information processing apparatus of the example embodiment 2.

FIG. 6 is an example block diagram illustrating a function-based configuration of the information processing apparatus 2000 of the example embodiment 2. The information processing apparatus 2000 of the present embodiment includes an acquisition unit 2120, likelihood calculation unit 2140, and classification unit 2160. The acquisition unit 2120 acquires the target trajectory data and one or more model data.

The likelihood calculation unit 2140 performs for each model data: 1) computing a scaling factor of the target trajectory data with respect to the model data; 2) generating a time-sequence of a latent position distribution of the object based on the scaling factor, the target trajectory data, and the model data; and 3) computing the likelihood of that the trajectory data is represented by the model data based on the target trajectory data and the time-sequence of the latent position distribution.

The classification unit 2160 determines that the target trajectory data represents a normal behavior when at least one of the likelihoods determined is substantially high (e.g. higher than or equal to a predetermined threshold). On the other hand, the classification unit 2160 determines that the target trajectory data represents an abnormal behavior when no likelihood determined is substantially high, e.g. all of the likelihoods determined are less than the predetermined threshold.

Advantageous Effect

According to the information processing apparatus 2000 of this example embodiment, the process of determining whether a trajectory data describes a normal behavior or an abnormal one (i.e. test phase of behavior recognition) is performed using the scaling factor of the target trajectory data with respect to each model data as illustrated FIG. 2. As introducing the scaling factor, the likelihood of that that trajectory data is represented by the model data is accurately calculated and thereby accurate classification is achieved.

<Flow of Processes>

Figure 7:
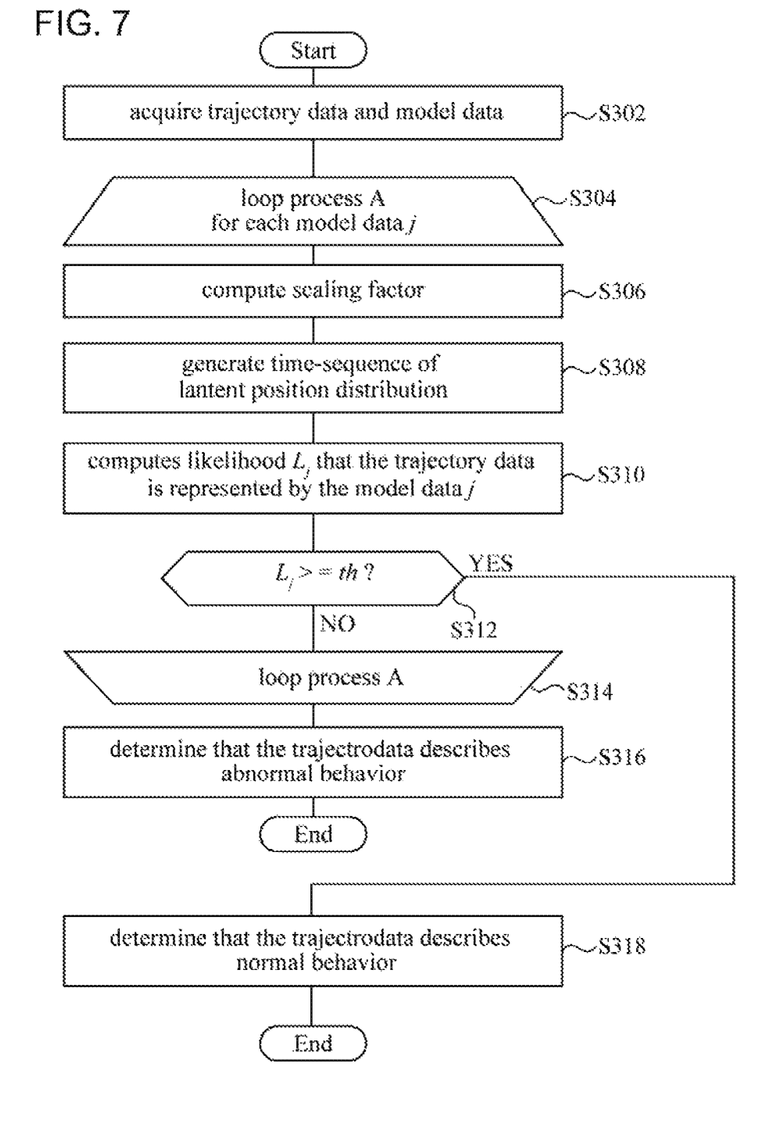
FIG. 7 is a flowchart illustrating the flow of processes performed by the information processing apparatus of the example embodiment 2.

FIG. 7 is a flowchart illustrating the flow of processes performed by the information processing apparatus 2000 of the example embodiment 2. The acquisition unit 2120 acquires the target trajectory data and one or more model data (S302).

Steps S304 to 314 form the loop process A to be performed for each model data. In Step 304, the likelihood calculation unit 2140 chooses one of the model data for which the loop process A is not performed yet. The chosen model data is denoted as model data j.

The likelihood calculation unit 2140 computes the scaling factor of the target trajectory data with respect to the model data j (S306). The likelihood calculation unit 2140 generates a time-sequence of the latent position distribution of the object corresponding to the target trajectory data (S308). With the scaling factor computed in S306, the time-sequence of the observed position included in the target trajectory data, and the time-sequence of the representative velocity of the model data j, the latent position distribution of the object can be sequentially computed for each time frame t with the following Equation:

Equation 6

$$\begin{cases} z_0 = x_0 - n \\ z_t = a * z_{t-1} + f * r_t - n2_t \ (t > 0) \end{cases} \quad (6)$$

where zt represents the latent position distribution at time frame t, xt represents the observed position at time frame t, n represents noise included in the observed position x, a represents a regression coefficient, f represents the scaling factor, rt represents the representative velocity of the model data j at time frame t, and n2t represents noise included in the estimated velocity f*rt.

The likelihood calculation unit 2140 computes the likelihood that the trajectory data is represented by the model data j, which is denoted by Lj (S310). The classification unit 2160 determines whether the likelihood Lj is higher than or equal to a predetermined threshold th (S312). When it is determined that Lj is higher than or equal to th, the classification unit 2160 determines that the trajectory data represents a normal behavior (S318).

On the other hand, when it is determined that Lj is less than th, the process proceeds to S314 and return to S304, i.e. the first step of the loop process A, since Step S314 is the termination step of the loop process A. After the loop process A is performed for all model data, the process proceeds from S304 to S316.

The fact that the process reaches S316 means that no model data is determined to represent the trajectory data well. Thus, the classification unit 2160 determines that the trajectory data represents an abnormal behavior (S316).

<Acquisition of Trajectory Data>

The acquisition unit 2120 acquires the trajectory data to be compared with model data, i.e. the target trajectory data (S302). The acquisition unit 2120 can acquire the target trajectory data in the same manner as that the acquisition unit 2020 acquires the trajectory data.

<Acquisition of Model Data>

The model data to be compared with the target trajectory data is also acquired in Step S302. There is a variety of ways to acquire the model data, similar to those to acquire the trajectory data. In some embodiments, the acquisition unit 2120 may acquire the model data from a storage device storing the model data, which may be installed inside or outside the information processing apparatus 2000. In some embodiments, the acquisition unit 2120 receives the model data sent from an apparatus that generates the model data.

<Computation of Scaling Factor>

For each model data j, the likelihood calculation unit 2140 computes the scaling factor. The scaling factor with respect to the model data j can be computed by comparing observed velocities and representative velocities of the model data j. The observed velocity at the time frame t can be computed as difference between the observed positions xt and x_t−1.

For example, the scaling factor with respect to the model data j can be described as follows:

Equation 7

$$f_j = \text{average}\left(\sum \frac{r_{j,t} \cdot (x_t - x_{t-1})}{\|r_{j,t}\|^2}\right) \quad (7)$$

where fj represents the scaling factor with respect to the model data j, and rjt represents the representative velocity of the model data j at the time frame t.

<Computation of Likelihood>

The likelihood calculation unit 2140 computes the likelihood that the trajectory data is represented by the model data j, which is denoted by Lj (S310). In some embodiments, the likelihood calculation unit 2140 computes the likelihood lt of that the observed position xt of the target trajectory data i is sampled from the latent position distribution zt for each time frame t. Then, the likelihood calculation unit 2140 computes the product of the sequence it for all time frames as the overall likelihood Lj.

<Further Classification>

In some embodiments, further to determining whether the acquired trajectory data describes a normal behavior or an abnormal one, the classification unit 2160 may classifies the trajectory data into one of normal behavior groups when the trajectory data describes a normal behavior. Each normal behavior group is associated with one of the model data in advance. The classification unit 2160 determines the model data the calculated likelihood of which is highest, and classifies the trajectory data into the normal behavior group that is associated with the determined model data, as long as the likelihood calculated as for the determined model data is substantially high. When the highest likelihood is determined to be not substantially high, the trajectory data is determined as describing an abnormal behavior.

<Example of Hardware Configuration>

A hardware configuration of the information processing apparatus 2000 of the example embodiment 2 may be illustrated by FIG. 3 similarly to the example embodiment 1. However, in the present example embodiment, each program module stored in the above-described storage 1080 includes a program for realizing each function described in the present example embodiment.

As described above, although the example embodiments of the present invention have been set forth with reference to the accompanying drawings, these example embodiments are merely illustrative of the present invention, and a combination of the above example embodiments and various configurations other than those in the abovementioned example embodiments can also be adopted.

The invention claimed is:

1. An information processing apparatus comprising:
a memory storing instructions; and
at least one hardware processor configured to execute the instructions to implement:
an acquisition unit acquiring trajectory data that represents a time-sequence of an observed position of an object, and model data that includes a time-sequence of a representative velocity of objects,
a likelihood calculation unit calculating for each model data:
computing a scaling factor of the trajectory data with respect to the model data by comparing an observed velocity and the representative velocity of the model data, the observed velocity being computed by using the observed position;
generating a time-sequence of a latent position distribution of the object based on the scaling factor, the trajectory data, and the model data; and
computing the likelihood of that the trajectory data is represented by the model data, and
a classification unit determining that the trajectory data represents a normal behavior when there is at least one model data that represents the trajectory data, and determining that the trajectory data represents an abnormal behavior when there is no model data that represents the trajectory data, wherein
the scaling factor with respect to the model data is described as Equation (7), $$f_j = \text{average}\left(\sum \frac{r_{j,t} \cdot (x_t - x_{t-1})}{\|r_{j,t}\|^2}\right) \quad (7)$$

wherein $f_j$ represents the scaling factor with respect to the model data j, and $r_{j,t}$ represents the representative velocity of the model data j at time frame t, and $x_t$ represents the observed position at the time frame t.

2. An information processing apparatus comprising:
a memory storing instructions; and
at least one hardware processor configured to execute the instructions to implement:
an acquisition unit acquiring trajectory data that represents a time-sequence of an observed position of an object, and model data that includes a time-sequence of a representative velocity of objects,
a likelihood calculation unit calculating for each model data:
computing a scaling factor of the trajectory data with respect to the model data by comparing an observed velocity and the representative velocity of the model data, the observed velocity being computed by using the observed position;
generating a time-sequence of a latent position distribution of the object based on the scaling factor, the trajectory data, and the model data; and
computing the likelihood of that the trajectory data is represented by the model data, and
a classification unit determining that the trajectory data represents a normal behavior when there is at least one model data that represents the trajectory data, and determining that the trajectory data represents an abnormal behavior when there is no model data that represents the trajectory data, wherein
the latent position distribution of the object is computed for each time frame t with the Equation (6), $$\begin{cases} z_0 = x_0 - n \\ z_t = a * z_{t-1} + f * r_t - n2_t \quad (t > 0) \end{cases} \quad (6)$$

wherein $z_t$ represents the latent position distribution at time frame t, $x_t$ represents the observed position at the time frame t, n represents noise included in the observed position $x_0$, a represents a regression coefficient, f represents the scaling factor, $r_t$ represents the representative velocity of the model data j at the time frame t, and $n2_t$ represents noise included in an estimated velocity $f*r_t$.

3. A method, performed by a computer, comprising:
acquiring trajectory data that represents a time-sequence of an observed position of an object, and model data that includes a time-sequence of a representative velocity of objects;
calculating for each model data;
computing a scaling factor of the trajectory data with respect to the model data by comparing an observed velocity and the representative velocity of the model data, the observed velocity being computed by using the observed position;
generating a time-sequence of a latent position distribution of the object based on the scaling factor, the trajectory data, and the model data; and
computing the likelihood of that the trajectory data is represented by the model data; and
determining that the trajectory data represents a normal behavior when there is at least one model data that represents the trajectory data, and determining that the trajectory data represents an abnormal behavior when there is no model data that represents the trajectory data, wherein
the scaling factor with respect to the model data is described as Equation (7), $$f_j = \text{average}\left(\sum \frac{r_{j,t} \cdot (x_t - x_{t-1})}{\|r_{j,t}\|^2}\right) \quad (7)$$

wherein $f_j$ represents the scaling factor with respect to the model data j, and $r_{j,t}$ represents the representative velocity of the model data j at time frame t, and $x_t$ represents the observed position at the time frame t.

4. A method, performed by a computer, comprising:
acquiring trajectory data that represents a time-sequence of an observed position of an object, and model data that includes a time-sequence of a representative velocity of objects;
calculating for each model data;
computing a scaling factor of the trajectory data with respect to the model data by comparing an observed velocity and the representative velocity of the model data, the observed velocity being computed by using the observed position;
generating a time-sequence of a latent position distribution of the object based on the scaling factor, the trajectory data, and the model data; and
computing the likelihood of that the trajectory data is represented by the model data; and
determining that the trajectory data represents a normal behavior when there is at least one model data that represents the trajectory data, and determining that the trajectory data represents an abnormal behavior when there is no model data that represents the trajectory data, wherein the latent position distribution of the object is computed for each time frame t with the Equation (6), $$\begin{cases} z_0 = x_0 - n \\ z_t = a * z_{t-1} + f * r_t - n2_t \quad (t > 0) \end{cases} \quad (6)$$

wherein $z_t$ represents the latent position distribution at time frame t, $x_t$ represents the observed position at the time frame t, n represents noise included in the observed position $x_0$, a represents a regression coefficient, f represents the scaling factor, $r_t$ represents the representative velocity of the model data j at the time frame t, and $n2_t$ represents noise included in an estimated velocity $f*r_t$.

5. A non-transitory computer-readable medium storing a program causing a computer to execute a method, the method comprising:
acquiring trajectory data that represents a time-sequence of an observed position of an object, and model data that includes a time-sequence of a representative velocity of objects;
calculating for each model data;
computing a scaling factor of the trajectory data with respect to the model data by comparing an observed velocity and the representative velocity of the model data, the observed velocity being computed by using the observed position;
generating a time-sequence of a latent position distribution of the object based on the scaling factor, the trajectory data, and the model data; and
computing the likelihood of that the trajectory data is represented by the model data; and
determining that the trajectory data represents a normal behavior when there is at least one model data that represents the trajectory data, and determining that the trajectory data represents an abnormal behavior when there is no model data that represents the trajectory data, wherein
the scaling factor with respect to the model data is described as Equation (7), $$f_j = \text{average}\left(\sum \frac{r_{j,t} \cdot (x_t - x_{t-1})}{\|r_{j,t}\|^2}\right) \quad (7)$$

wherein $f_j$ represents the scaling factor with respect to the model data j, and $r_{j,t}$ represents the representative velocity of the model data j at time frame t, and $x_t$ represents the observed position at the time frame t.

6. A non-transitory computer-readable medium storing a program causing a computer to execute a method, the method comprising:
acquiring trajectory data that represents a time-sequence of an observed position of an object, and model data that includes a time-sequence of a representative velocity of objects;
calculating for each model data;
computing a scaling factor of the trajectory data with respect to the model data by comparing an observed velocity and the representative velocity of the model data, the observed velocity being computed by using the observed position;
generating a time-sequence of a latent position distribution of the object based on the scaling factor, the trajectory data, and the model data; and
computing the likelihood of that the trajectory data is represented by the model data; and
determining that the trajectory data represents a normal behavior when there is at least one model data that represents the trajectory data, and determining that the trajectory data represents an abnormal behavior when there is no model data that represents the trajectory data, wherein
the latent position distribution of the object is computed for each time frame t with the Equation (6), $$\begin{cases} z_0 = x_0 - n \\ z_t = a * z_{t-1} + f * r_t - n2_t \quad (t > 0) \end{cases} \quad (6)$$

wherein $z_t$ represents the latent position distribution at time frame t, $x_t$ represents the observed position at the time frame t, n represents noise included in the observed position $x_0$, a represents a regression coefficient, f represents the scaling factor, $r_t$ represents the representative velocity of the model data j at the time frame t, and $n2_t$ represents noise included in an estimated velocity $f*r_t$.

\* \* \* \* \*